United States Patent [19]
Wang

[11] Patent Number: 5,836,524
[45] Date of Patent: Nov. 17, 1998

[54] LIQUEFACTION OF WASTES WITH PRODUCT OIL RECYCLING

[75] Inventor: Hong-Paul Wang, Tana, Taiwan

[73] Assignee: National Science Council, Taipei, Taiwan

[21] Appl. No.: 723,929

[22] Filed: Oct. 1, 1996

[51] Int. Cl.⁶ .................................................. B02C 19/12
[52] U.S. Cl. ........................ 241/23; 241/65; 241/260.1; 241/DIG. 31
[58] Field of Search ................................... 241/23, 260.1, 241/DIG. 31, DIG. 38, 186.5, 65

[56] References Cited

U.S. PATENT DOCUMENTS

| | | | |
|---|---|---|---|
| 4,240,587 | 12/1980 | Letsch | 241/23 |
| 4,250,158 | 2/1981 | Solbakken et al. | 423/449 |
| 4,284,618 | 8/1981 | Van Der Heyden et al. | 423/605 |
| 4,384,151 | 5/1983 | Audibert et al. | 585/241 |
| 4,983,278 | 1/1991 | Cha et al. | 208/407 |
| 5,264,640 | 11/1993 | Platz | 585/241 |

*Primary Examiner*—John M. Husar
*Attorney, Agent, or Firm*—Beveridge, DeGrandi, Weilacher & Young, LLP

[57] ABSTRACT

A one-step thermal treatment process for liquefaction of solid wastes selected from the group consisting of printed circuit board wastes, plastic wastes, rubber wastes, scrap fires, used cables/wires, auto shredder residues, contaminated soils, and waste lubricating oils to recover valuable oil products. Apparatus is provided and includes a means for continuous feeding, an inclined screw liquefaction reactor (ISLR), and means for handling oils and gas products. Wastes are liquefied in used lubricating oils or recycled heavy oil product at relatively low temperatures, and the unliquefied inorganic materials are recovered.

22 Claims, 4 Drawing Sheets

LIQUEFACTION OF WASTES WITH PRODUCT OIL RECYCLING

FIELD OF THE INVENTION

The present invention relates to a method and equipment of liquefaction process, and an equipment apparatus of inclined screw liquefaction reactor(ISLR).

BACKGROUND OF THE INVENTION

Billions of gallons of fuel oil and it's equivalent are discarded every year through the disposal of printed circuit board wastes, plastic wastes, rubber wastes, scrap tires, used cables/wires, auto shredder residues, contaminated soils, and waste lubricating oils. Recycling of these wastes is of increasing importance as incineration and landfilling become more expensive and the acceptance of these methods is decreasing. It should be noted that rubber and plastic wastes are produced originally from crude oil and can be thermally cracked into fuels or petrochemicals. However, these wastes generally containing inorganics materials, fibers, glass, dust and poor thermal conducting materials, which are far more difficult to be treated effectively.

Many direct pyrolysis processes have been reported to have technical or economic difficulties. Indeed, pyrolysis is complicated by the fact that the polymeric material wastes are poor conductors and degradation of these macromolecules requires considerable amount of energy. The liquefaction process involves treating solid wastes with hot waste lubricating oil at temperatures between 500–700 K (below general pyrolysis temperatures). Basically, organic macromolecules are soluble in heavy oils only if they are cracked effectively. Above 500 K, the C—C bonds of the polymeric matrix can be disrupted and dissolved.

A process and apparatus for conveying waste tires to fuels is described in U.S. Pat. No. 4,384,151 to auditbert et al. Whole tires are treated by means of flowing heavy oil. Carbon black is not recovered from this process. Reclamation of waste rubber by microwave treatment is the subject of U.S. Pat. Nos. 4,250,158 to solvakken et al and 4,284,618 to van der Heyden et al. Only limited success has been achieved with scrap tires as feed after the metal wire and tire fabric were removed. In contrast with the subject invention, the process described in U.S. Pat. Nos. 4,384,151 and 4,983,278 to cha et al. do not conduct liquefaction or pyrolysis processes of scrap tires in a continuous and single-step mode operation.

SUMMARY OF THE INVENTION

The objective of the invention is to disclose a one-step thermal treatment process, when applied, the technique can be used to treat solid wastes which are liquefied in hot oil. By recycling the product heavy oils, and the unliquefied inorganic materials, a considerable decrease in environmental pollution can be achieved.

The further objective of the invention is to disclose an apparatus of inclined screw liquefaction reactor(ISLR). The apparatus can be used for various solid wastes where they are thermally treated e.g. crushed, liquefied and pyrolyzed etc. Pyrolysis and oil liquefaction processes take place simultaneously.

DESCRIPTION OF THE INVENTION

The present invention relates to a liquefaction/pyrolysis process for recovering valuable organic wastes such as: plasticwastes, scrap tires, rubber wastes, printed circuit board wastes, used cables/wires, oil deposit/sediment, contaminated soil, auto shredder residues, organic residue in inorganic wastes, and waste lubricating oil.

The continuous process of this invention which comprise liquefaction and pyrolysis of wastes are conducted in an inclined screw liquefaction reactor(ISLR). It can increase the efficiency of the process of separation and transferring. The reaction conditions are mild and suitable for energy recycling. The waste lubricating oils and waste engine oil could be converted into oil(solvent). The invention is able to treat two kind of wastes simultaneously, flexible for input and suitable for resource recovering treatment for all kind of organic wastes.

The quantity of organic-containing solid wastes increases rapidly at the rate of millions of tons per year. These organic-containing solid wastes are equivalent to approximately thousands of billions kcal, which is a huge amount of thermal potential energy/heat and about half are from petroleum products. These solid wastes such as: printed circuit board wastes, rubber wastes, plastic wastes, scrap tire, organic wastes from auto shredder residues, oil sludge/sediment etc., are usually mixed with inorganic materials i.e., iron-wires, metal, fiber, wood, glass. Generally the solid wastes are polluted by organic matter and this increases the difficulty of resource recovering treatment.

In general, thermal treatment of wastes can recover energy and resources. These technologies includes incineration, pyrolysis, oil liquefaction and gasification. Wastes incineration produces $CO_2$ and $H_2O$, but also produces some particulate, heavy metals, halides, $SO_x$, and $NO_x$. The accumulated pollutants have a negative impact on the environment. In addition the emission of PCCDS and PCDFS is also a serious problem. Under the condition of absence of oxygen, the macro organic compounds are cracked into smaller molecules and are recovered as the light hydrocarbons gases and light oil in the pyrolysis process. However, successful operation process for commercial purposes with direct pyrolysis are very few. This is due to engineering and operational problems such as (a) low heat transfer coefficient of the solid organic matter which affect the efficiency of the pyrolysis process; (b) high viscosity of products make the the pyrolysis process more difficult; and (c) the pyrolysis products are not economically attractive, generally.

Thus, in order to overcome these difficulties that are mentioned above, the inventor presents a liquefaction/pyrolysis process and an apparatus of inclined screw liquefaction reactor (ISLR).

The major goal in this present invention is using liquefaction/pyrolysis process to carry out the resource recovering for the solid wastes which have high thermal potential energy/heat. The solid wastes are: printed circuit board wastes, rubber wastes, plastic wastes, scrap tire, organic wastes from auto shredder residues, oil sludge/sediment etc. The solid wastes are liquefied in hot oil or recycled product heavy oils at relatively low temperatures. The liquefaction/pyrolysis process comprises the main step of heat transfer by the hot oil to swell the structure of the highly polymeric organic material and lead to selective bond breaking. Therefore, the major products are oils, and can be separated easily from the mixtures of inorganic materials. The reaction temperature is usually less than 400° C., which is much lower than that of any other known thermal treatment technologies. The need of the gas treatment equipment also becomes much less due to the lower quantity of the gas products. This proposed process can treat wastes mentioned above such as; printed circuit board wastes, scrap tire, plastic wastes, and other difficult-to-treat wastes as well as the used motor oil. Hence the goal of treating several kinds of wastes simultaneously can be achieved.

DESCRIPTION OF THE DRAWINGS

The above objectives and advantages of the present invention will become more apparent by describing the attached drawings, in which.

Figure 1:
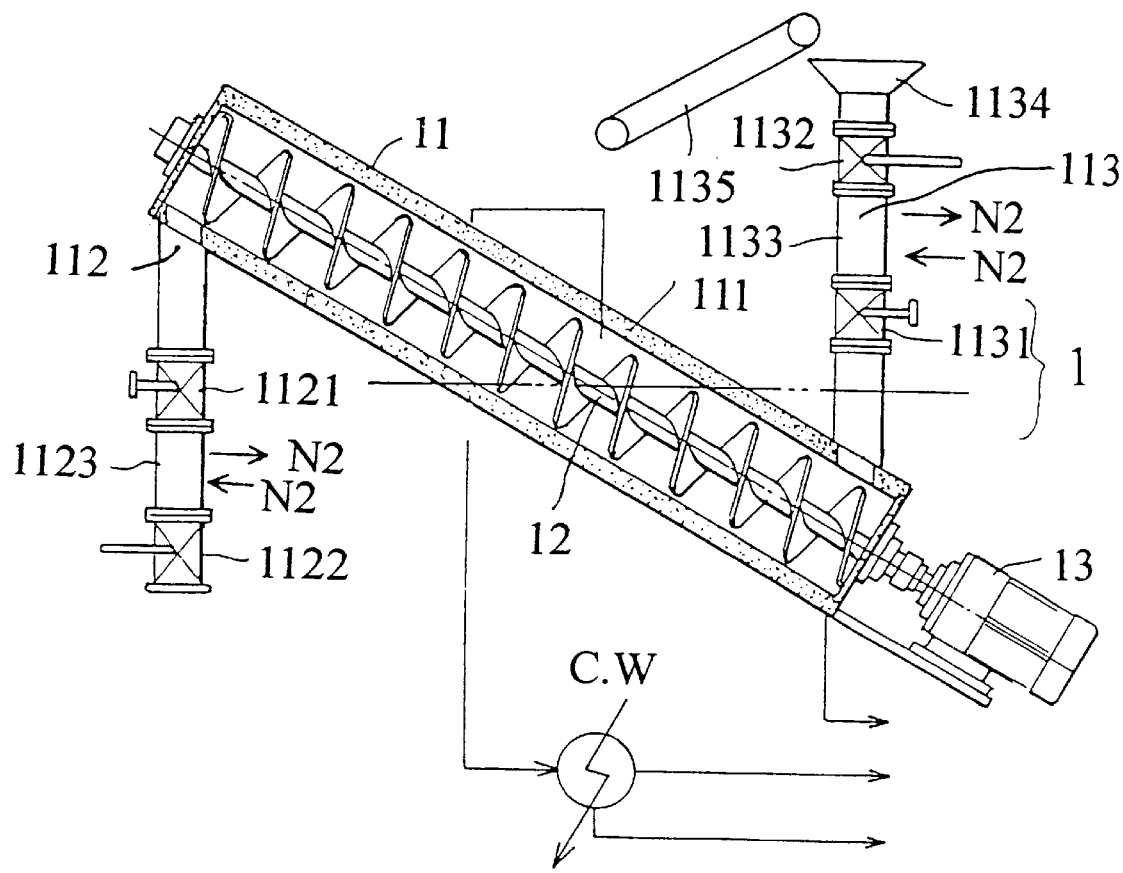
FIG. 1 shows a longitudinal section diagram of inclined screw liquefaction reactor.

The attached tables are as follows:
Table 1. Typical composition of tire
Table 2. Products distribution for liquefaction of scrap tire
Table 3. Product gas composition for liquefaction of scrap tire
Table 4. NMR data of light oil from liquefaction of scrap tire
Table 5. Characterization of light oil from liquefaction of scrap tire
Table 6. Products distribution from liquefaction of printed circuit board waste
Table 7. Characterization of light oil from liquefaction of printed circuit board waste
Table 8. NMR data of light oil from liquefaction of printed circuit board waste
Table 9. Product distribution for liquefaction of cable/wire waste
Table 10. Characterization of light oil from liquefaction of cable/wire waste

REFERENCE NUMBER OF ELEMENTS IN THE DRAWINGS

Inclined Screw Liquefaction Reactor (1)
Separator (3)
Heater (2)
Reactor Body (11)
Insulation (111)
Outlet pipe connector (112)
Inlet pipe connector (113)
Gate valves (1121), (1122), (1131), (1132)
Connection pipe (1123), (1133)
Feed hopper (1134)
Conveyor (1135)
Screw (12)
Variable speed motors (13)
Pipe (14), (15), (16)
Oil feeder (21)
Heavy oil tank (22)
Pump (23)
Oil preheating tank (24)
Oil pipe (241)
Main fuel burner (25)
Auxiliary fuel burner (26)
Air Blower (27)
Ferreous metal (31)
Non-Ferreous metal (32)

DETAILED DESCRIPTION OF THE INVENTION

Figure 2:
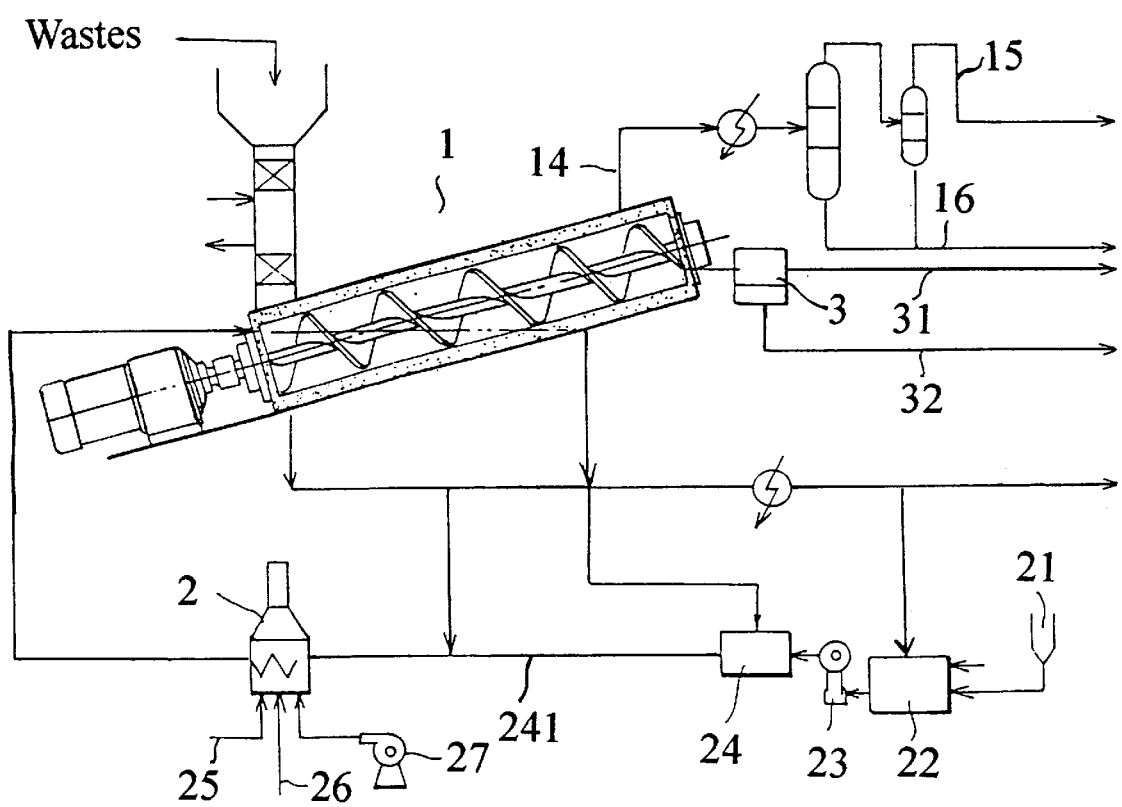
FIG. 2 shows a integral process diagram of waste liquefaction.

The equipments and the liquefaction process flow diagram are shown in FIGS. 1 and 2. Steps of the process are described as follows:

A. The wasted products of petroleum chemicals are crushed to about the size of 5–10 cm.

B. Liquefaction of wastes is conducted in the inclined screw liquefaction reactor(ISLR) at 200°–400° C., to recycle valuable light oil.

C. The inorganic materials are cleaned up by pyrolysis.

The inclined screw liquefaction reactor(ISLR, 1) includes the main body (11), screw (12), and variable speed motors (13). The surface of main body (11) is covered with an appropriate insulation (111). On the main body (11) two sides have separate setting for outlet pipe connector (112) and inlet pipe connector (113), where one can connect the gate valve sets (1121), (1122) and (1131), (1132) respectively.

The connection pipe (1123), (1133) exist between the gate valve sets (1121) and (1122) or gate valve sets (1131) and (1132), the top of gate valve sets (1131) have a feed hopper (1134). Wastes on a conveyor (1135) are transported into the inclined screw liquefaction reactor (1) through feed hopper (1134). The screw (12) built in the reactor body (11) is driven by the variable speed motors (13).

The wastes of motor oil or lubricating oil are transported to the heavy oil tank (22) through the oil feeder (21), using pump (23) to deliver them into the oil preheating tank (24), through pipe (241). The oil is heated to the required temperature in the heater (2). Heater (2) was heated to an appropriate temperature by burning the mixture of the product gas or heavy oil from liquefaction process through the main fuel burner (25) and natural gas or product gas is fed through the auxiliary fuel burner (26), and the air is introduced by the blower (27).

Hot liquefaction products were transferred into the inclined screw liquefaction reactor (1) to liquefy the wastes. The area in the reactor which is filled with hot oil is called the liquefaction zone and the space above the oil is the pyrolysis zone.

During pyrolysis, volatile organic gas are vaporized through the tube (14) for appropriate treatment (e.g. condensation or separation). Some volatile organic gases or, light oil products subsequently flow out through pipes (15) and (16) respectively. After pyrolysis the contaminated inorganic materials which are free of oil are then separated with the separator (3) to ferrous metals (31) or non-ferrous metals (32) and can be separated or recovered.

The objective of the invention relates to the apparatus as inclined screw liquefaction reactor (1), which is shown in FIG. 1. The further objective of the invention relates to a one-step thermal treatment process, as simultaneous oil liquefaction/pyrolysis operations shown in FIG. 2. The major design concepts of the invention are illustrated below:

wastes which are difficult to treat are feed continuously. The wastes are liquefied/pyrolyzed in the inclined screw liquefaction reactor shown in FIG. 1. They are mainly converted to light oil at 200°–400° C. Inorganic residues are transported to pyrolysis zone by the screw to remove the adsorbed oils. The oil liquefaction and pyrolysis are in a single-step operation mode which reduces the operations of transferring and separation. The inclined screw liquefaction reactor(ISLR) can also perform the pyrolysis reaction. The process of stirring, transportation and solid-liquid separation are accomplished by the screw. Reaction time can be controlled by the screw speed.

The reaction temperatures normally are 200°–400° C. for liquefaction and 300°–500° C. for pyrolysis and the corresponding reaction pressure is 0–100 psig. The liquefaction process uses hot oil to liquefy the wastes and convert them mostly into light oil and some into heavy oil and various types of organic gases. Light oil can be used as re-refining chemicals, materials or it can be used directly as fuel. Heavy oil can be used as liquefied oil and can also be recycled and re-used or as the heat source of the process. Part of the volatile organic gases obtained could be utilized as heat source or chemicals.

The liquefaction and pyrolysis has a host of advantages in treating waste and recycling process and includes the following:

1. The liquefaction and pyrolysis process can treat more than two kinds of wastes at the same time.
2. The liquefaction and pyrolysis reaction conditions are very mild and usually the temperature of operation is less than 400° C. The organic wastes are mostly therefore converted into high value organic materials like light oil.
3. After liquefaction and pyrolysis processes, the product oil could be re-refined, used as chemicals, materials, solvent or used directly as a fuel.
4. Liquefaction and pyrolysis techniques could be used in the treatment of difficult-to-treat wastes with a high heating value.
5. This liquefaction and pyrolysis method can be continuously operated and the engineering and design processes are simple. The operation and maintenance are also easy and has high potential for future development.
6. The process and its equipments are very versatile and any kind of organic waste can be accepted.
7. All kinds of products could be recovered and this enhances the economic efficiency.
8. This is a small type of waste treatment and resources recovery equipment which is suitable for middle and small-sized factories.
9. The equipment could be easily moved to any location when required.

EXAMPLE 1

The Scrap Tires and Waste Rubber Treated With the Liquefaction/Pyrolysis Process The main purpose of the liquefaction and pyrolysis process of scrap tires and waste rubber is to separate organic materials from inorganic materials, to reduce the volume of waste or to recover the resources. Tires contain different kind of high molecular weight materials composition as shown in Table 1. The bonds of the high molecular weight materials are selectively broken to produce lower molecular weight of liquid or gaseous organic materials. It is not only useful for separating efficiently organic from inorganic materials but also to recover the resources and energy. Note that at a temperature of 370° C., only 20% of the scruptires are pyrolyzed. Even over 480° C., only 40% is pyrolyzed.

Figure 3:
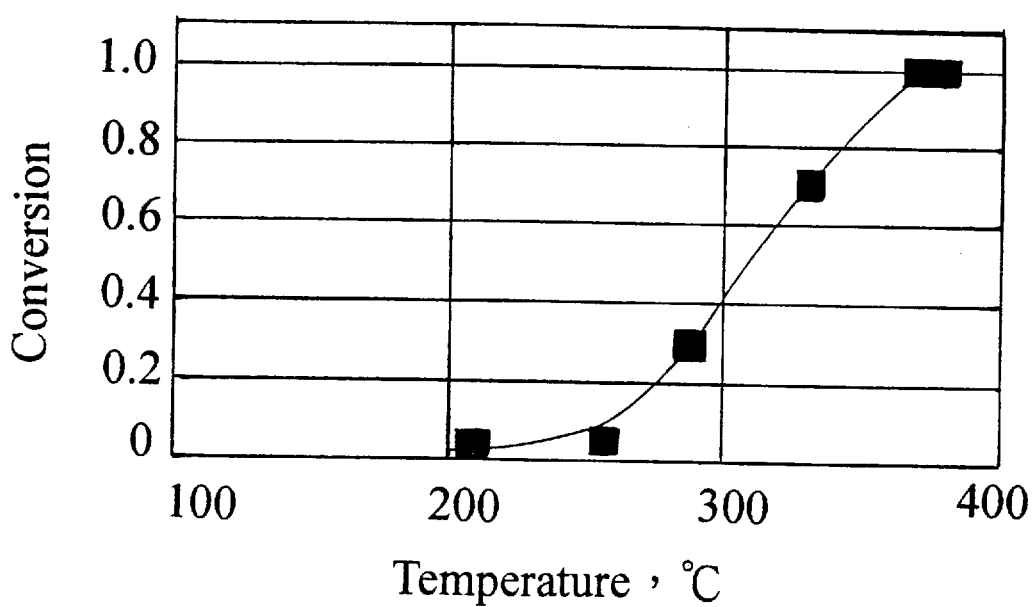
FIG. 3 shows an effect of temperature on conversion of liquefaction of scrap tires.
Figure 4:
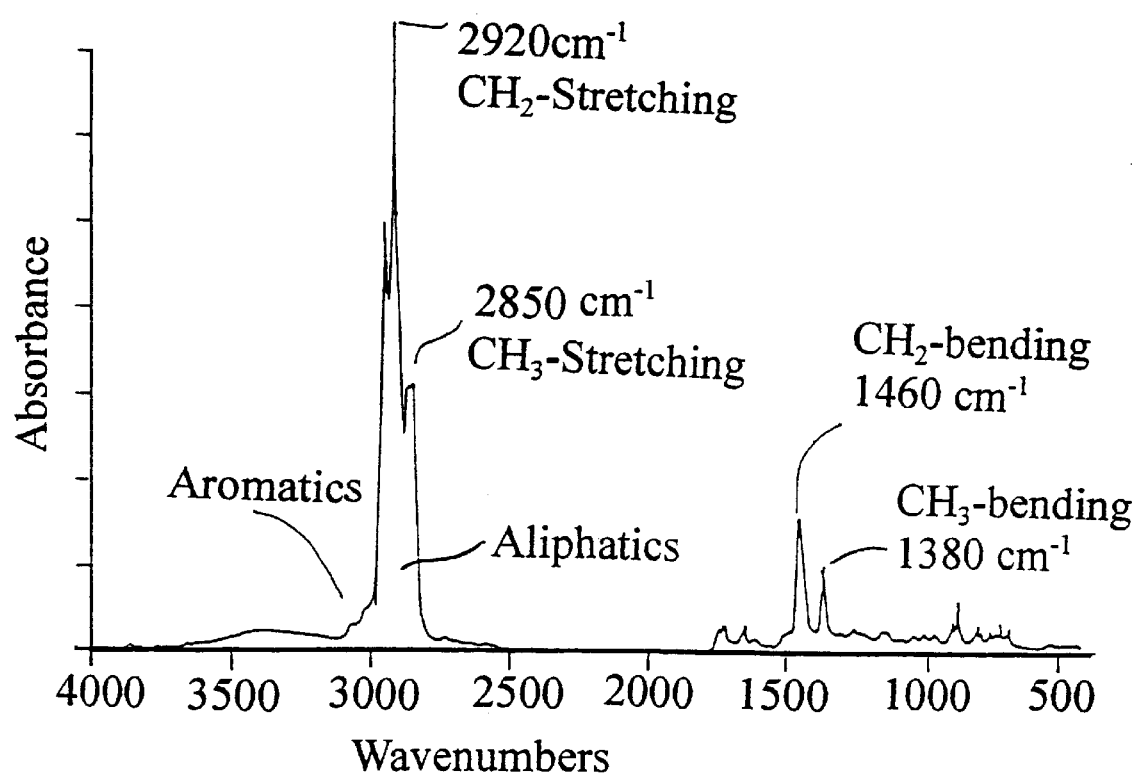
FIG. 4 shows a FTIR spectrum of light oil from liquefaction of scrap tires.

The liquefaction and pyrolysis process is used to treat scrap tires. The hot oil medium can transfer the heat into rubber structures and make them swell. This invention utilizes temperatures in the range of 370°–380° C. which could make the tires(sizes are about 5 cm) undergo total pyrolysis and be converted mainly into light oil. If the temperature is less than 320° C., the conversion of the scrap tires is less than 60%. As shown in FIG. 3, the oil used in the liquefaction could be selected from waste motor oil, waste lubricant oil or other waste oils.

The scrap tires scrapping sizes are usually between 5–10 cm, the liquefaction temperature at 370° C., the pressure of reaction is about 0–50 psig, feeding ratio of oil to scrap tire is equal to 2 and the reaction time is between 20–30 minutes. The products of the oil liquefaction of the scrap tire are shown in Table 2. The light oil product is about 12.4% and can be used for fuels or auxiliary fuels. The gas product approximates 4.4% (the gas breakdown is shown in Table 3) of which butene is the major component. These volatile organic gas contains low sulfur composition as $H_2S(<0.5\%)$. The volatile organic gas can be re-used for synthetic polymer starting materials. After clean-up, it could be used as a heat source of this process. Solid residue like carbon black, iron wires and fiber after pyrolysis (550° C.), the organic and inorganic materials can be recovered.

The light oils recovered from oil liquefaction and pyrolysis process could be used and meet required analyzed standard. Spectra methods could also be utilized to study the chemical property of these oils. Results show that the light oil could be further cracked and these results can be interpreted by NMR data. Table 4 shows that alkanes and alkenes are the major component of the light oil(H-aromatics=7.60% and H-aliphatic=92.4%).

It well known that waste motor oil and scrap tires are products of petroleum chemistry. Basically the processing, treatment and recovery of the wastes use petroleum chemical process like refining and re-synthesis and is principally the best way to utilize these waste materials. Scrap tires after liquefaction could produce 10–60% of light oil. If the reaction time is longer, the amount of products is correspondingly increasing. From Table 5, light oil contain 33.2% of naphtha. Naphtha is the major component of gasoline. Heavy gas oil could be further cracked to produce light oil or directly used as fuel.

The heavy oil is one of the products in the scrap tire liquefaction process and contains more than 90% gas oil and vacuum residue. Its boiling temperature distribution is very similar to that of motor oils. Generally, the boiling point of vacuum residue is over 538° C. and it is suitably treated with coker, fluidized catalytic cracker or other de-asphalting technologies. The heavy gas oil, may be used as a fuel oil, or converted to the light oil by the catalytic cracker.

The heavy oil obtained from liquefaction of scrap tires may be refined by vacuum distillation, separating the vacuum residues from gas oils. The gas oil is then hydrogenated or cracked to produce gasoline or diesel oil. The coke may be used as a fuel or recover useful metal like zinc.

In the liquefaction process, ZnO and rubber sulfur are reacted and produce ZnS. Therefore, the sulfur content in light oil and volatile organic gas are relatively very low ($H_2S<0.5\%$), and can be recovered and used in synthesis of high polymer chemicals or to be used as the process fuel.

EXAMPLE 2

The Printed Circuit Board Wastes Treated With the Liquefaction/Pyrolysis Process The printed circuit board wastes scrapping size at 10×3 cm setting were subjected to the liquefaction conditions as listed below:

temperature –320° C., reaction time is 30 min, feed the mixtures in the ratio of wastes/oil equal to ½. The typical products distribution in the printed circuit board wastes liquefaction process are shown in Table 6.

The products distribution includes oil 58.4%, volatile organic gas 5.3% and solid residue 36% which contains Cu mainly. The light oil product contains about 74% gas oil listed in Table 7. Table 8 shows that the light oil contains aromatic compounds, H-aromatics=11.71%, and H-aliphatic, 88.29%. The major components in the light oil are the alkanes and alkenes group. The light oil products liquefaction of printed circuit board wastes can be re-refined or used as a fuel, or auxiliary fuel, or other useful solvents, as mentioned in example 1.

EXAMPLE 3

The Used Wires/Cable Treated With the Liquefaction/Pyrolysis Process

The used wires/cable treated with the oil liquefaction process operates at 320° C. The products distribution is listed in Table 9, wherein iron wires is 42%, heavy oil is 46%, light oil 7.5% and gas product 4.9% which contains more than 15% of butene group. Based on the spectroscopic analysis, the major chemical composition of the light oil is aliphatic groups. However, the oil product analysis (listed in Table 10) shows that the light oil contains heavy naphtha 23% and gas oil 67%. The solid residue products from the used wires/cable liquefaction process is essentially Cu metal. Table 11 shows that light oil contains 5.06% aromatic compounds (H-aromatics) and 94.94% of H-aliphatic. The major components of light oil are alkanes and alkenes. The light oil products from this process can be re-refined or used as a fuel, or auxiliary fuel, or other useful solvents, as mentioned in example 1. The pure Cu and Ag wire can be recovered from solid residue by pyrolysis reaction.

EXAMPLE 4

The Plastic Wastes (PP, PS, PET, PVC, and PE) Treated With the Liquefaction/Pyrolysis Process The used rubber treated with the oil liquefaction process at the temperature less than 370° C. and in recovering heavy oil, the experimental procedures are similar to that described in example 1. The liquefaction products, heavy oil and light oil, can be re-refined used as a fuel, or auxiliary fuel, or useful solvents, which was mentioned in example 1.

EXAMPLE 5

The Waste Slurry/Oil Contaminated Soil Treated With the Liquefaction/Pyrolysis Process The waste slurry or sludge were subjected to pyrolysis in an inclined screw liquefaction reactor. The organic contents in slurry or sludge are controlled or removed completely. The treatment methods of contaminated soil are similar to that of slurry. The pyrolysis products, light oil, used as a fuel, or auxiliary fuel or other useful solvents, as mentioned in example 1.

EXAMPLE 6

The Auto Shredder Residues (Auto Fluffs) With the Liquefaction/Pyrolysis Process Generally, the main recovery product in the treatment of used car is metal. The residues mainly consist of glass, plastic, woods, oil and metals that are difficult-to-treat. The quantity of these used car organic residues (auto fluff) are enormous. For example, the auto shredder residue (ASR) is about 3 million tons per year in U.S.A., the auto crusher residue (ACR) is about 0.28–0.42 million tons per year in France, and one million tons per year in Japan. In this invention, the used car and its organic residues are treated with the liquefaction/pyrolysis process. This reaction proceed at 300°–370° C. and 30 minutes reaction time. The experimental results show that the organic materials (i.e. plastic, rubber) are dissolved fully in the hot oil and the residue mainly contain glasses and metals. The liquefaction products, light oil and heavy oil, can be re-refined, used as a fuel, auxiliary fuel or other useful solvents, as mentioned in example 1.

TABLE 1

A typical composition of the tire rubber.

| components | wt % | Functions |
| --- | --- | --- |
| SBR | 62.1 | Styrene-butadiene copolmer |
| Carbon Black | 31.0 | Acting primarily to strengthen and impact abrasion resistance to the rubber |
| Extender Oil | 1.9 | rubber softener (softening the rubber to make it more workable) |
| Zinc oxide | 1.9 | Enhancing the physical properties of the rubber, also acting in harmony with the accelerator and hardener. |
| stear acid | 1.2 | |
| sulfur | 1.1 | Reacting with the double bonds in adjacent polymer chains to cause cross-linking, which hardens the rubber and prevents excessive deformation at elevated temperature |
| Accelerator | 0.7 | Acting as a catalyst for the vulcanization process |

TABLE 2

The product distribution in the scrap tire liquefaction process.

| Product | distribution % |
| --- | --- |
| Heavy oil | 73.4% |
| condensate (light oil) | 12.4% |
| Gas | 4.4% |
| solids | 9.8% |

TABLE 3

The gas phase composition in the scrap tire liquefaction process.

| components | Wt % |
| --- | --- |
| CO | 2.6 |
| $CO_2$ | 17.1 |
| $H_2$ | 0.5 |
| $H_2S$ | ND |
| $C_1$ | 4.3 |
| $C_2^-$ | 4.9 |
| $C_2$ | 2.1 |
| $C_3^-$ | 2.9 |
| $C_3$ | 4.4 |
| $C_4^-$ | 54.4 |
| $C_4$ | 3.6 |
| $nC_4$ | 3.2 |

TABLE 4

The NMR analysis of the light oil produced from the scrap tire liquefaction process.

| Components | peak |
| --- | --- |
| H-alpha, % | 15.93 |
| H-beta, % | 50.81 |
| H-gamma, % | 12.25 |

TABLE 4-continued

The NMR analysis of the light oil produced from the scrap tire liquefaction process.

| Components | peak |
|---|---|
| H-aliph, % | 92.40 |
| H-ole, % | 10.41 |
| H-arom, % | 7.61 |
| H-alpha/H-arom, % | 2.10 |

*Average Carbon No. 5

TABLE 5

The characterization of the light oil products in the liquefaction process of the scrap tire.

| Gravity, API | 30.4 | Cut | wt % |
|---|---|---|---|
| element analysis | wt % | $C_6$ 200° F. light naphtha | 0 |
| C | 84.17 | 200–400° F. heavy naphtha | 33.2 |
| H | 12.16 | 400–650° F. light gas oil | 32.8 |
| N | 0.94 | 650–1000° F. heavy gas oil | 25.8 |
| S | 1.39 | 1000° F.⁺ Vaccum resid | 8.2 |

TABLE 6

The products distribution in the liquefaction process of the printed circuit board wastes.

| Products distribution, | wt % |
|---|---|
| heavy oil | 54.9 |
| light oil (condensate) | 3.5 |
| Volatile organic gas | 5.3 |
| Inorganic Residues | 36.3 |

*Reaction temperature, 320 C.
Reaction time, 30 Min.
conversion 1

TABLE 7

The characterization of the light oil products in the liquefaction process of the printed circuit board wastes.

| Cut | wt % |
|---|---|
| $C_6$-200° F. light naphtha | 0 |
| 200–400° F. heavy naphtha | 14.9 |
| 400–650° F. light gas oil | 26.8 |
| 650–1000° F. heavy gas oil | 47.2 |
| 1000° F. Vaccum resid | 11.1 |

TABLE 8

The NMR analysis of the light oil products in the liquefaction process of the printed circuit board wastes.

| Components | peak |
|---|---|
| H-alpha, % | 4.97 |
| H-beta, % | 54.47 |
| H-gamma, % | 24.79 |
| H-aliph, % | 88.29 |
| H-ole, % | 4.06 |
| H-arom, % | 11.71 |
| H-alpha/H-arom, % | 0.42 |

TABLE 9

The product distribution in the liquefaction process of the used cables/wires.

| Products distribution, | wt % |
|---|---|
| heavy oil | 46.0 |
| light oil (condensate) | 7.5 |
| Volatile organic gas | 4.9 |
| Inorganic Residues | 41.6 |

*Reaction temperature, 320 C.
Reaction time, 30 Min.
conversion 1

TABLE 10

The characterization of the light oil products in the liquefaction process of the used cables/wires.

| Cut | wt % |
|---|---|
| $C_6$-200° F., light naphtha | 0 |
| 200–400° F., heavy naphtha | 22.7 |
| 400–650° F., light gas oil | 15.3 |
| 650–1000° F., heavy gas oil | 51.4 |
| 1000° F.⁺, Vaccum resid | 10.6 |

TABLE 11

The NMR analysis of the light oil products in the liquefaction process of the used cables/wires.

| Components | peak |
|---|---|
| H-alpha, % | 11.99 |
| H-beta, % | 66.36 |
| H-gamma, % | 15.75 |
| H-aliph, % | 94.94 |
| H-ole, % | 0.84 |
| H-arom, % | 5.06 |
| H-alpha/H-arom, % | 2.37 |

What is claimed:

1. A resource recycling method of waste treatment of a feed with liquefaction and pyrolysis in an inclined liquefaction/pyrolysis zone, said zone having a liquefaction zone at a lower end and a pyrolysis zone at an upper end, said method comprising the steps of:

crushing the feed into small pieces having a size of about 5–10 cm, feeding the crushed feed into said liquefaction zone, introducing oil into said liquefaction zone, liquefying the crushed feed with the oil at a temperature of 200°–400° C., moving the crushed feed upwardly into said pyrolisis zone, and pyrolyzing an output from the liquefying step at a temperature of 300°–500° C. in said pyrolysis zone.

2. The resource recycling method according to claim 1, wherein the pressure in the liquefactional/pyrolysis zone is in the range of 0–100 psig.

3. The resource recycling method according to claim 1, wherein the pressure in the liquefaction/pyrolysis zone is in the range of 0–50 psig.

4. The resource recycling method according to claim 1, wherein the oil is heavy oil.

5. The resource recycling method according to claim 1, further comprising the step of removing oil from a lower end of said liquefaction zone.

6. The resource recycling method according to claim 1, further comprising the step of removing products formed in said pyrolysis zone from an upper end of said pyrolysis zone.

7. The resource recycling method according to claim 6, wherein said products are at least one of a gas and a solid.

8. The resource recycling method according to claim 7, wherein the produced heavy oil and a portion of the produced gas are used to heat the oil and maintain the temperature for the liquefaction step.

9. The resource recycling method according to claim 1, wherein the feed is scrap tires.

10. The resource recycling method according to claim 1, wherein the feed is rubber wastes.

11. The resource recycling method according to claim 1, wherein the feed is plastic wastes.

12. The resource recycling method according to claim 1, wherein the feed is printed circuit boards.

13. The resource recycling method according to claim 1, wherein the feed is used cables and wires.

14. The resource recycling method according to claim 1, wherein the feed is oil deposits and sediment.

15. The resource recycling method according to claim 1, wherein the feed is auto parts.

16. The resource recycling method according to claim 1, wherein the feed is waste lubricating oil.

17. The resource recycling method according to claim 1, wherein the feed is contaminated soil.

18. The resource recycling method according to claim 1, wherein the feed is liquefied in oil at an oil-to-feed weight ratio of about 2:1.

19. A liquefaction/pyrolysis resource recycling device for feed comprising:

a feed hopper, an inlet pipe having one end connected to said feed hopper, an inclined reactor body connected to the other end of said inlet pipe, a rotatable screw within said reactor body, a motor rotationally connected to said inclined screw, an outlet pipe having one end connected to an upper end of said reactor body, a separator connected to the other end of said outlet pipe, said separator separates ferrous metal product from non-ferrous metal product, and an oil supply means for supplying oil to the lower end of said reactor body;

said reactor body having a liquefaction zone and a pyrolysis zone, wherein feed from said feed hopper enters said liquefaction zone before passing through said pyrolysis zone; and whereby the feed is liquified in said liquefaction zone and products are separated in said pyrolisis zone.

20. The liquefaction/pyrolysis resource recycling device for feed according to claim 19, wherein said oil supply means comprises:

an oil feeder, an oil preheating tank, a heater for the oil in communication with said oil preheating tank and with said liquefaction zone of said reactor body, a fuel burner for heating the oil in said heater; and pumping means for pumping oil from said oil feeder into said oil preheating tank and said heater to said liquefaction zone in said reactor body.

21. The liquefaction/pyrolysis resource recycling device for feed according to claim 20, wherein said fuel burner comprising a main fuel burner and an auxiliary fuel burner for heating the oil in said heater to a required temperature for use in said liquefaction zone of said reactor body, said main fuel burner burning either product gas or heavy oil produced in said liquefaction zone of said inclined screw, said auxiliary fuel burner burning at least one of the product gases from said liquefaction zone of said reactor body, the product gas from said pyrolysis zone of said reactor body, and natural gas.

22. A liquefaction/pyrolysis resource recycling device for feed consisting essentially of a feed hopper, an inlet pipe having one end connected to said feed hopper, an inclined reactor body having a lower end connected to the other end of said inlet pipe, a rotatable screw within said inclined reactor body, a motor connected to said inclined screw, a gas outlet pipe connected at one end to an upper end of said inclined reactor body and at another end to a means for separating and condensing gas into either gas or light oil, a solids separator connected to an upper end of said inclined reactor body for separating ferrous metal product from non-ferrous metal product, and an oil supply device supplying oil to the lower end of said reactor body;

said inclined reactor body having a liquefaction zone and a pyrolysis zone, said pyrolysis zone is connected to said gas outlet pipe and said solids separator wherein feed from said feed hopper enters said liquefaction zone before passing through said pyrolysis zone; and whereby said feed is liquified in said liquefaction zone and separates in said pyrolysis zone into at least one of a solid product which passes into said solids separator and a gaseous product which passes into said gas outlet pipe.

* * * * *